United States Patent
Rosenberger

[11] 3,843,229
[45] Oct. 22, 1974

[54] OPTICAL WAVEGUIDE HAVING A GRADED REFRACTIVE INDEX CORE FORMED OF SILICON AND GERMANIUM

[75] Inventor: Dieter Rosenberger, Munich, Germany

[73] Assignee: Siemens Aktiengesellschaft, Berlin & Munich, Germany

[22] Filed: Nov. 16, 1972

[21] Appl. No.: 307,101

[30] Foreign Application Priority Data
Nov. 25, 1971  Germany............................ 2158515

[52] U.S. Cl............... 350/96 WG, 106/73.5, 350/1, 350/96 R
[51] Int. Cl. .............................................. G02b 5/14
[58] Field of Search ............................. 350/96 WG

[56] References Cited
UNITED STATES PATENTS
| | | | |
|---|---|---|---|
| 3,434,774 | 3/1969 | Miller............................ | 350/96 WG |
| 3,614,197 | 10/1971 | Nishizawa et al. ............. | 350/96 WG |
| 3,711,262 | 1/1973 | Keck et al. ............... | 350/96 WG UX |

OTHER PUBLICATIONS
Chang et al. "Experimental Observation of 10.6-$\mu$m Guided Waves in Ge Thin Films" Applied Optics Vol. 10, No. 10, October 1971, pp. 2361-2362.

*Primary Examiner*—John K. Corbin
*Attorney, Agent, or Firm*—Hill, Gross, Simpson, Van Santen, Steadman, Chiara & Simpson

[57] ABSTRACT

An optical waveguide having a refractive index which decreases radially outwards from a center core zone thereof and is composed of a mixture of 1 to 10 percent by weight germanium and silicon. A waveguide rod is produced in a single operation by positioning a stock rod composed of silicon and germanium in a suitable enclosure having means for heating the rod to a selected temperature and passing a gas mixture that includes thermo-decomposable silicon and germanium compounds through the enclosure. Silicon and germanium are deposited on the rod at a ratio that is controlled by a predetermined germanium distribution. The amount of germanium within the waveguide can be varied in a stepwise manner or in accordance with a parabolic curve. Once a desired rod radius is achieved, the rod is drawn in a conventional drawing device to form an optical fiber.

5 Claims, 1 Drawing Figure

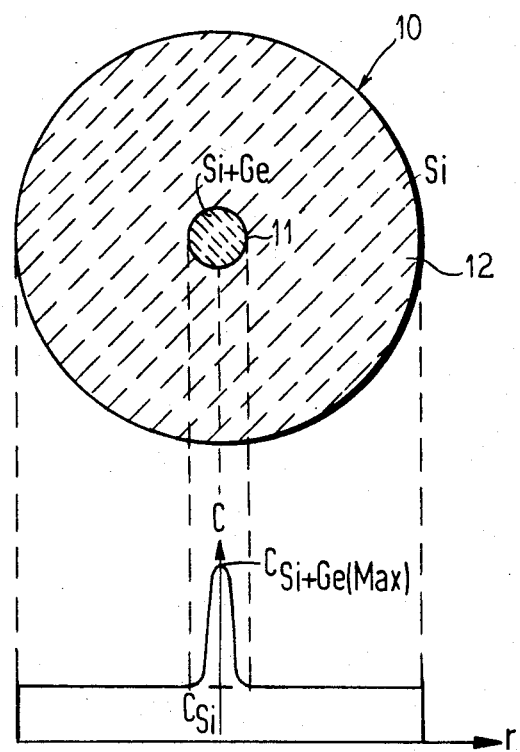

OPTICAL WAVEGUIDE HAVING A GRADED REFRACTIVE INDEX CORE FORMED OF SILICON AND GERMANIUM

BACKGROUND OF THE INVENTION

1. Field of the Invention

The invention relates to optical waveguides and more particularly to optical waveguides characterized by low light attenuations and a method of producing the same.

2. Prior Art

Normally, optical waveguides are composed of a soda-lime glass, i.e. a mixture containing as a major constituent more than 60% $SiO_2$ and having $Na_2O$ and $CaO$ as minor additives. By varying the ratio of materials within this mixture, the refractive index profile of optical waveguides produced therefrom can be altered and thus allow controlled guidance of light within such optical waveguides. Depending upon the shape of the refractive index profile, a distinction may be made between envelope-type and gradient-type optical waveguides.

An important factor in the development of optical waveguides has been attenuation characteristics of the material forming the waveguide. Optical attenuation must be kept as low as possible in order, for example, to enable the undistorted transmission of information over large distances. In an article entitled "Fiber Optics Sharpens Focus on Laser Communications" by John N. Kessler in Electronics, July 5, 1971, optical waveguides are described in which attenuation characteristics of 20 db/km (decibels per kilometer) for light having a wavelength of $0.6\mu$ (microns) have been achieved. However, when infrared light having a wavelength of a few microns is being transmitted, the attenuation rises sharply. When quartz or glass is utilized in forming optical waveguides, such as fibers, considerable light losses occur when such optical fibers couple light into and out of semiconductor devices because the refractive indices of glass or quartz radically differ from those of semiconductor materials.

U.S. Pat. No. 2,825,260 describes a method of producing optical fibers comprised of a distinct core element and a distinct envelope element. Generally, this method requires two separate operations whereby a cylindrical core and a tubular envelope are first produced and the envelope is then slid over or mounted onto the core and the assembled core-envelope block is then drawn to produce a fiber. This is relatively complex and uneconomical.

SUMMARY OF THE INVENTION

The invention provides an optical waveguide which attenuates infrared light to a very small degree and has a refractive index compatible with semiconductor coupling devices.

It is a novel feature of the invention to provide an optical waveguide composed of a mixture of a major proportion of silicon and a minor proportion of germanium and having a refractive index which gradually decreases radially outwardly from its core zone. Preferably, the core zone is composed of a mixture of 1 to 10 percent by weight of germanium, with the remainder silicon and the envelope zone of the waveguide being composed of substantially pure silicon. The refractive index of such a waveguide is radially varied from the core axis outwards in a stepwise or a continuous manner by regulating the ratio of silicon to germanium within the core zone.

It is another novel feature of the invention to produce an optical waveguide in a single operation. A stock silicon-germanium rod is placed in a suitable housing having means for heating the rod to a selected temperature, such as electrodes that interconnect the opposite ends of the rod and subject the rod to electric resistance heating. A gas mixture that includes thermodecomposable silicon and germanium compounds, such as silicon and germanium tetrachlorides or alcoholates, flows past the heated rod so that silicon and germanium are deposited on the rod. The ratio of silicon to germanium being deposited is regulated by varying the amount of silicon and germanium compounds within the gas mixture in accordance with a selected germanium distribution. After a desired rod radius is achieved, it is drawn into an optical fiber.

BRIEF DESCRIPTION OF THE DRAWING

The drawing is an enlarged cross-sectional view of an optical waveguide produced in accordance with the principles of the invention, along with an illustrative graph showing the distribution of materials within such an optical waveguide as a function of radial distance from the center of the waveguide.

DESCRIPTION OF PREFERRED EMBODIMENTS

The invention provides an optical waveguide composed of a material which attenuates infrared light to a very small degree and has a refractive index that is very compatible with semiconductor coupling devices. The invention also provides a method of producing such optical waveguides.

The optical waveguides of the invention have a refractive index which gradually decreases radially outwardly from a core zone thereof and are composed of a major proportion of basic silicon and a minor proportion of germanium. When an optical waveguide composed of such material is utilized to transmit infrared light having a wavelength of more than $2\mu$, it exhibits an attenuation characteristic of less than 20 db/km.

A preferred light source for use with the optical waveguide of the invention is a semiconductor laser, of the type emitting infrared light. As exemplary embodiments of suitable light sources, indium arsenide lasers with an emission wavelength of $3.1\mu$ or indium antimonide lasers with an emission wavelength of $5.2\mu$ are mentioned. Since semiconductor devices of this type have refractive indices between 3 and 4, which are very close to the refractive index of silicon, the coupling of laser light from a semiconductor laser source into the optical waveguides of the invention is effected with very low energy losses.

When an optical waveguide of the invention is utilized as a singlemode optical waveguide having a core in an envelope, then the core is preferably composed of a mixture of silicon and 1 to 10 percent by weight of germanium and the envelope is composed of substantially pure silicon. For single-mode operation, the radius of a core composed of this kind of admixture is preferably in the range of about 2 to $6\mu$. The outer radius of the envelope is preferably about ten times the radius of the core.

In order to provide optical waveguides in accordance with the principles of the invention which have a refractive index distribution or profile that decreases radially outwards from the core zone of the waveguide, the amount of germanium within the basic silicon is gradually decreased outward from the core axis. The refractive index profile can be varied stepwise or continuously in this manner. When producing an optical waveguide for use as a single-mode waveguide, it is preferable to have a refractive index profile that decreases continuously outwards from the core axis. To achieve such a refractive index profile, the amount of germanium within the basic silicon within the core is continuously decreased, preferably in accordance with a parabolic curve, from a value $a\%$ by weight to 0 percent by weight, wherein $a$ is a value ranging between 1 and 10.

As shown on the drawing, an optical waveguide 10 of the invention is composed of a core zone 11 and an envelope zone 12. The waveguide 10 has an axial center C and a radius r. The core zone 11 is composed of a germanium doped silicon and contains the maximum amount of germanium at the center C, which gradually decreases radially outwardly, for example, in a parabolic manner, to 0 percent at the outer edge of the core zone. The envelope zone is composed of pure silicon.

The optical waveguides of the invention are produced by a method in which the rod or member that is later pulled or drawn to become an optical fiber is produced in a single operation. A small diameter core rod composed of silicon and germanium is positioned within a suitable housing for thermal decomposition of compounds in a gaseous state and which includes a means for heating the rod to a selected temperature. Preferably, the heating means comprise electrodes which are mounted on opposite ends of the rod so that upon energization, the rod is subjected to electric resistance heating. A gas mixture that includes a mixture of thermo-decomposable silicon and germanium compounds therein at a given ratio is provided and fed into the housing and past the heated rod so that such compounds decompose and silicon and germanium are deposited on the outer surfaces of the core rod. Preferred thermo-decomposable compounds are silicon and germanium terrachlorides and/or silicon and germanium alcoholates. The ratio of silicon to germanium that is deposited is selectively varied throughout the deposition process in accordance with a predetermined distribution function by varying the amount of silicon and germanium compounds within the gas. In this manner, either a parabolic or a stepwise distribution of germanium is achieved. The deposition process continues until the desired rod radius is achieved. Thereafter, the so-produced rod is pulled or drawn in a conventional pulling system to form an optical fiber.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appendant claims.

I claim as my invention:

1. An optical waveguide having a refractive index which gradually decreases outwards from a core zone of said waveguide, said waveguide being composed of a base material which is composed of silicon and having germanium distributed therein so that the germanium decreases from $a$ percent by weight at the center of said waveguide to 0 percent by weight at the outer periphery of said waveguide, wherein $a$ is a value ranging from 1 to 10.

2. An optical waveguide as defined in claim 1 and including an envelope zone composed of pure silicon.

3. An optical waveguide as defined in claim 2, wherein said core zone has a radius in the range of 2 to 6 microns and said envelope zone has a radius about ten times the radius of said core zone.

4. An optical waveguide as defined in claim 1 wherein the refractive index decreases radially outwards in accordance with a parabolic curve.

5. An optical waveguide as defined in claim 1 wherein the refractive index decreases radially outwards in a stepwise manner.

* * * * *